Patented Nov. 21, 1950 2,531,004

UNITED STATES PATENT OFFICE 2,531,004

ACETONITRILES AS AZO COMPONENTS IN DIAZOTYPES

Sam Charles Slifkin, Binghamton, N. Y., assignor to General Aniline & Film Corporation, New York, N. Y., a corporation of Delaware No Drawing. Application November 26, 1947, Serial No. 788,311

12 Claims. (Cl. 95—6)

This invention relates to photography and, more particularly, to diazotype compositions, light sensitive layers and processes employed in diazotype photoprinting.

In diazotype photoprinting, material comprising a layer sensitized with a light sensitive diazo compound, on or in a suitable base or carrier, is exposed to light of locally varied intensity in accordance with a predetermined pattern or design to be reproduced (as by exposure under a translucent sheet bearing an opaque image such as a line drawing or photographic image), whereby the diazo compound is partly or completely destroyed in the illuminated areas and the residual diazo compound in the shaded areas is adapted to yield a reproduction of the original upon development, especially by coupling with an azo coupling component.

In two-component systems, the light sensitive diazo compound is incorporated together with an azo coupling component in the light sensitive layer, the components of the layer being stabilized against coupling prior to development. After exposure to light under an original, the image is developed by treatment adapted to cause the diazo compound to couple with the azo component, e. g., by the dry process involving exposure of the layer to an alkaline vapor such as ammonia, or in some cases by a wet or semi-wet process involving treatment with an aqueous alkaline solution.

In the case of one-component systems, development after exposure generally involves application to the sensitized layer of the azo coupling component under conditions favoring coupling thereof with the residual diazo compound, e. g., by incorporating the coupling component in an aqueous alkaline solution and applying the latter to the sensitized layer.

Provision of diazotype light sensitive layers and compositions employed in the production of copies therewith, which will yield satisfactory results under conditions obtaining in practice, presents a number of problems. Thus, in two-component diazotype layers, serious difficulties arise in providing a sensitizing composition which possesses satisfactory stability to premature coupling, so that the sensitized materials carrying the composition in a light sensitive layer can be stored under atmospheric conditions without darkening and loss in sensitivity. Moreover, in two-component as well as in one-component systems, it is desirable to employ materials which, when left on the final prints, will not cause serious discoloration of the background on exposure to light and air. At the same time, it is desirable to provide image-forming materials which are adapted to couple rapidly so that prolonged development is not required, and likewise, to provide materials which will yield a wide range of colorations.

Light sensitive diazo compounds commonly employed are those derived from o- and p-aminonaphthols or from aromatic p-diamines of the benzene series having an undiazotized mono- or di-substituted amino group. Stabilizers commonly employed include acids such as citric, tartaric, sulfosalicylic, boric and phosphoric acids, and metal salts such as zinc chloride, tin chloride or cadmium chloride. Other ingredients include antioxidants such as thiourea, and humectants such as glycol or other polyhydric alcohols.

Azo coupling components heretofore proposed for use in preparing diazotype photoprints include particularly phenols, aromatic amines, acylacetarylides and pyrazolones. Phenols and amines are subject to the disadvantage that they tend to cause discoloration of the finished prints, are often relatively slow in coupling, and are more or less subject to premature coupling when incorporated in two-component systems. Pyrazolones and acylacetarylides yield a relatively limited range of colorations; while they are relatively fast in coupling, they tend to cause premature coupling in storage when incorporated in two-component diazotype systems. Many of the aforesaid coupling components heretofore employed could not be satisfactorily used for development of one-component systems in view of the fact that the colorations produced were too soluble in aqueous developing compositions, and became blurred or washed out in the developing treatment.

I have discovered that certain derivatives of acetonitrile, constituting a class of azo coupling components represented by the general formula:

$$R—CH_2—CN$$

wherein R is an organic group or radical possessing strongly negative characteristics (i. e., groups or radicals variously known as electrophilic, cationoid, electron attracting, or electron accepting), when incorporated in two-component diazotype layers, or when applied for the development of one-component diazotype layers, yield outstandingly superior results. Thus, when these compounds are incorporated in two-component layers together with a light sensitive diazo compound of the type ordinarily employed as set out above, and with the usual stabilizing ingredients, the photoprinting material thus obtained possesses greatly improved stability against premature coupling in storage, while at the same time the rapidity with which these azo components couple to form azo coloring materials approaches that of the acylacetarylides. Moreover, when the aforesaid azo components of my invention are left on the prints obtained by diazotype processes, the backgrounds show excellent stability against discoloration on exposure to light and air. Most of the azo components of my invention can also be used in aqueous developing compositions for the development of one-component diazotype layers without causing blurring of the image. At the same time, the coupling components of my invention provide a wide range of colorations as a result of the large number of compounds which can be made in accordance with the above formula by substituting different radicals for the radical represented by R.

In accordance with my invention the radical R in the above formula may represent a carboxyl group, an acyl radical of a carboxylic acid of the aliphatic series, for example, an acetyl radical, a nitro-substituted aryl radical containing the nitro group in at least one of its ortho and para positions, e. g., a p-nitro-phenyl radical, as well as other organic radicals of strongly negative character.

Light sensitive diazo components preferably employed with the coupling components of my invention in one or two-component layers include, for example, diazo compounds derived from 1,2-, 2,1-, and 1,4-amino-naphthols or from N-substituted p-diamines of the benzene series such as p-amino-N-methyl aniline, p-amino-N-ethoxy aniline, p-amino-N-ethyl-N-ethoxy aniline, 4-amino-2-methoxy-N-cyclohexyl aniline, or p-amino-N-diethyl-m-toluidine; from heterocyclic amino compounds such as 3-amino-carbazole; and from o-amino-naphthol sulfo acids such as 2-amino-1-hydroxy-3,6-naphthalene disulfonic acid and 1-amino-2-hydroxy-naphthalene 4-sulfonic acid.

Stabilizers which can be included comprise acids such as phosphoric, boric, citric, tartaric or sulfosalicylic acids, metal salts such as zinc chloride, tin chloride or cadmium chloride, as well as anti-oxidants such as thiourea, humectants such as glycol and other adjuvants heretofore known.

The various ingredients of the sensitizing composition containing a light sensitive diazo compound, with or without an azo coupling component as defined above, are preferably applied in an aqueous solution to a suitable carrier or base material such as paper. If desired, the paper may be coated with gelatin or other sizing materials. Films or foils of plastic materials such as regenerated cellulose, cellulose esters or ethers (e. g., cellulose acetate or ethyl cellulose), or resins such as polyvinyl alcohols can also be sensitized in similar manner. The carrier or base to be sensitized may include a coating of the aforesaid plastic materials on a suitable support; or laminated structures including a surface layer suitable for sensitization can be employed. To facilitate or promote absorption of sensitive materials or compositions by plastic films, water-soluble organic solvents or swelling agents for the plastic (e. g., alcohols, ketones, esters and the like, such as ethyl, methyl or isopropyl alcohol, methyl ethyl ketone or ethyl lactate) are preferably incorporated in the aqueous sensitizing solution. After impregnation in the aforesaid manner, the sensitized photoprinting material is dried, while protecting it from actinic radiation until used.

Two-component layers containing the coupling components of this invention are most conveniently developed after exposure to light under a pattern or design to be reproduced, by treatment with an alkaline vapor such as ammonia or an aliphatic amine; or if desired, they can be developed by moistening with an aqueous alkaline developing solution containing, for example, an alkali metal carbonate or tertiary phosphate. One-component layers are developed in accordance with this invention by application of an aqueous alkaline solution containing an azo coupling component as defined by the general formula set out above, dissolved therein, for example, in concentrations of 1 to 10% of coupler by weight of the solution with 5 to 20% of alkaline salts. If desired, organic water-miscible solvents such as alcohols, esters or ketones (e. g., methyl or ethyl alcohol, acetone or methyl ethyl ketone, or ethyl lactate) can be included to promote penetration of the diazotype layer by the developing solution, especially when the layer is a film of plastic material of if the coupling component is difficulty soluble in aqueous alkaline solution.

The following examples illustrate preparation of diazotype sensitizing compositions and photoprinting materials containing the coupling components of my invention, and the process for preparing copies therewith.

*Example 1*

A solution was prepared containing the following ingredients:

50 cc. water
25 cc. isopropyl alcohol
5 cc. formic acid
2 g. thiourea
1 g. zinc chloride
3 g. sulfosalicylic acid
4 g. zinc chloride double salt of p-diazo-N,N-diethyl-m-phenetidine
1 g. p-nitrobenzyl cyanide A sheet of cellulose acetate film was coated with the aforesaid solution, the excess thereof removed, and the sheet allowed to dry, while protecting the same from actinic radiation. After exposure to ultraviolet light under an original to be reproduced such as a line drawing or photographic transparency, the print was developed by exposing the sheet to ammonia vapor, yielding a deep purple positive image of the original.

*Example 2*

A solution was prepared having the same composition as in Example 1 except that 1 gram of cyano-acetic acid was substituted for the p-nitrobenzyl cyanide of the aforesaid example. A cellulose acetate sheet sensitized with the resulting composition, as described in the first example, yielded, upon exposure to light under an original and development by treatment with ammonia vapor, a yellow positive image of the original.

*Example 3*

A solution was prepared having the following composition:

100 cc. water
5 cc. ethylene glycol
5 g. thiourea
5 g. zinc chloride
5 g. citric acid
3 g. zinc chloride double salt of p-diazo-dimethyl aniline
2 g. acetylacetonitrile The resulting solution was applied to a sheet of paper, and the latter dried while protecting it from actinic light. Upon exposure of the resulting sheet to light under an original pattern to be reproduced, and developing by exposure to ammonia vapor, a yellow positive image of the original was formed.

By omitting the azo coupling components from the sensitizing compositions in the foregoing examples, and applying the resulting solutions in the same manner as described above to cellulose acetate or paper, one-component diazotype materials are formed. These are similarly exposed to light under a pattern to be reproduced, and thereupon developed by application of an aqueous alkaline solution containing, for example, 10% of sodium carbonate, and 1% of cyano acetic acid, p-nitrobenzyl cyanide, acetylacetonitrile, or one of the other coupling components defined by the general formula given above in accordance with my invention. Upon drying, copies similar to those produced in the foregoing examples are obtained.

Other azo coupling components which can be substituted for those employed in the foregoing examples include 2,4-dinitrobenzyl cyanide, and similar compounds.

The photoprinting materials produced in the foregoing examples showed excellent stability against premature coupling in storage. Thus, a sheet produced as described in Example 3 is much more stable than a sheet similarly prepared employing acetoacetarylide as the coupling component. Moreover, the copies produced are characterized by excellent stability against background discoloration on exposure to light and air.

Variations and modifications which will be obvious to those skilled in the art can be made in the process and compositions of this invention without departing from the scope or nature thereof.

I claim:

1. In the process of preparing diazotype copies, the step which comprises coupling the residual light sensitive diazo compound, contained in a light sensitive diazotype layer after exposure thereof to light in a predetermined pattern, with an azo coupling component having the following general formula:

$$R—CH_2—CN$$

wherein R is a member of the group consisting of an acyl radical of an aliphatic carboxy acid, a carboxyl group and an aryl radical containing a nitro group in at least one of the ortho- and para-positions.

2. In the process of preparing diazotype copies, the step which comprises coupling the residual light sensitive diazo compound, contained in a light sensitive diazotype layer after exposure thereof to light in a predetermined pattern, with an azo coupling component having the following general formula:

$$R—CH_2—CN$$

wherein R is an acyl radical of an aliphatic carboxy acid.

3. In the process of preparing diazotype copies, the step which comprises coupling the residual light sensitive diazo compound, contained in a light sensitive diazotype layer after exposure thereof to light in a predetermined pattern, with an azo coupling component having the following general formula:

$$R—CH_2—CN$$

wherein R is an aryl radical containing a nitro group in at least one of the ortho and para positions.

4. In the process of preparing diazotype copies, the step which comprises coupling the residual light sensitive diazo compound, contained in a light sensitive diazotype layer after exposure thereof to light in a predetermined pattern, with cyano acetic acid.

5. In the process of preparing diazotype copies, the step which comprises coupling the residual light sensitive diazo compound, contained in a light sensitive diazotype layer after exposure thereof to light in a predetermined pattern, with p-nitro-benzyl cyanide.

6. In the process of preparing diazotype copies, the step which comprises coupling the residual light sensitive diazo compound, contained in a light sensitive diazotype layer after exposure thereof to light in a predetermined pattern, with acetylacetonitrile.

7. Diazotype photoprinting material comprising a light sensitive layer stabilized against coupling prior to development thereof, comprising a light sensitive diazo compound and a coupling component of the following general formula:

$$R—CH_2—CN$$

wherein R is a member of the group consisting of an acyl radical of an aliphatic carboxy acid, a carboxyl group and an aryl radical containing a nitro group in at least one of the ortho- and para-positions.

8. Diazotype photoprinting material comprising a light sensitive layer stabilized against coupling prior to development thereof, comprising a light sensitive diazo compound and a coupling component of the following general formula:

$$R—CH_2—CN$$

wherein R is an acyl radical of an aliphatic carboxy acid.

9. Diazotype photoprinting material comprising a light sensitive layer stabilized against coupling prior to development thereof, comprising a light sensitive diazo compound and a coupling component of the following general formula:

$$R—CH_2—CN$$

wherein R is an aryl radical containing a nitro group in at least one of the ortho and para positions.

10. Diazotype photoprinting material comprising a light sensitive layer stabilized against coupling prior to development thereof, comprising a light sensitive diazo compound and as an azo coupling component, cyano acetic acid.

11. Diazotype photoprinting material comprising a light sensitive layer stabilized against coupling prior to development thereof, comprising a light sensitive diazo compound and as an azo coupling component, p-nitrobenzyl cyanide.

12. Diazotype photoprinting material comprising a light sensitive layer stabilized against coupling prior to development thereof, comprising a light sensitive diazo compound and as an azo coupling component, acetylacetonitrile.

SAM CHARLES SLIFKIN.

REFERENCES CITED

The following references are of record in the file of this patent:

UNITED STATES PATENTS

| Number | Name | Date |
|---|---|---|
| 1,943,377 | Ellis | Jan. 16, 1934 |
| 1,989,065 | Schmidt et al. | Jan. 22, 1935 |
| 2,108,602 | Mannes et al. | Feb. 15, 1938 |
| 2,113,330 | Mannes et al. | Apr. 5, 1938 |
| 2,115,394 | Mannes et al. | Apr. 26, 1938 |
| 2,217,189 | Sus | Oct. 8, 1940 |
| 2,312,040 | Kendall et al. | Feb. 23, 1943 |
| 2,334,495 | Kendall et al. | Nov. 16, 1943 |
| 2,380,809 | Verkinderen et al. | July 31, 1945 |
| 2,453,661 | Glass et al. | Nov. 9, 1948 |